United States Patent [19]

Otsuka et al.

[11] 3,709,785
[45] Jan. 9, 1973

[54] METHOD OF PRODUCING L-TYROSINE BY FERMENTATION

[75] Inventors: Shinichiro Otsuka, Kanagawa-ken; Takeshi Honda, Kanagawa-ken; Akio Yamanoi, Tokyo, all of Japan

[73] Assignee: Ajinomoto Co., Inc., Tokyo, Japan

[22] Filed: Oct. 13, 1970

[21] Appl. No.: 80,506

[30] Foreign Application Priority Data

Oct. 29, 1969 Japan.................................44/86602

[52] U.S. Cl. ..........................195/29, 195/47, 195/28
[51] Int. Cl. .............................................C12d 13/06
[58] Field of Search.......................195/29, 47, 30, 28

[56] References Cited

OTHER PUBLICATIONS

Chemical Abstracts, Vol. 55, Col. 22488 g (1958).
Chemical Abstracts, Vol. 73, Col. 2675e (1970).

Primary Examiner—Alvin E. Tanenholtz
Attorney—Kelman and Berman

[57] ABSTRACT

Spontaneously or artificially induced mutants of microorganisms of the genera Brevibacterium, Corynebacterium, Arthrobacter, Bacillus, and Candida which are capable of growing on otherwise conventional culture media containing enough m-fluorophenylalanine to suppress growth of the respective parent strains include many strains also capable of producing extracellular L-tyrosine in amounts sufficient to warrant recovery on a commercial scale. The most effective tyrosine producing mutants were derived from strains of Brevibacterium flavum and lactofermentum, Bacillus subtilis, and Candida lipolytica.

9 Claims, No Drawings

METHOD OF PRODUCING L-TYROSINE BY FERMENTATION

This invention relates to the production of L-tyrosine, and particularly to a method of producing L-tyrosine by fermentation.

L-Tyrosine, hereinafter referred to as tyrosine, is an amino acid important as a nutrient, and has been used as a food supplement and in medicine.

Tyrosine has been prepared on a commercial scale from protein hydrolyzates at relatively high cost in a complex procedure. An auxotrophic mutant of Micrococcus glutamicus requiring phenylalanine has been known to accumulate tyrosine in a culture medium (Japanese Patent Publication No. 14395/1964).

We have now found that certain mutants tolerant to m-fluorophenylalanine, which are derived by conventional mutation methods from microorganisms belonging to the genera Brevibacterium, Corynebacterium, Arthrobacter, Bacillus, and Candida, are capable of producing extracellular tyrosine during aerobic fermentation of conventional nutrient media.

The mutation methods employed for obtaining the mutants include exposure of the parent strains to ultraviolet light, X-rays, or gamma rays in mutagenic doses, or to sodium nitrite, nitrosoguanidine, or diethyl sulfate, which are known chemical mutagenic agents, the several physical and chemical mutagenic agents being interchangeable for all practical purposes.

The mutants for use in this invention are selected from the exposed parent strains by conventional screening methods based on the fact that the mutants can grow on an agar medium or in an aqueous medium containing m-fluorophenylalanine in an amount which inhibits the growth of the parent strain. The amount of m-fluorophenylalanine in the screening media necessary for suppressing growth of the parent strain varies according to the parent strain, but generally more than 50 γ/ml m-fluorophenylalanine are needed.

The parent strains used for obtaining the most productive mutants belong to the genera Brevibacterium, Bacillus, and Candida, and are themselves unable to produce extracellular tyrosine in economically significant amounts.

Particularly effective tyrosine-producing mutants are Brevibacterium flavum FERM-P 422, Brevibacterium lactofermentum FERM-P 423, Bacillus subtilis FERM-P 464, and Candida lipolytica FERM-P 424.

Specimen cultures of the strains identified above by FERM-P numbers are freely available without our permission from the Fermentation Research Institute, Agency of Industrial Science & Technology at 1-8-5, Inage Higashi, Chiba-shi, Chiba, Japan.

The parent strains of the mutants mentioned above are *Brevibacterium flavum* ATCC No. 14067, *Brevibacterium lactofermentum* ATCC No. 13870, *Bacillus subtilis* ATCC No. 13952, and *Candida lipolytica* ATCC No. 16617, respectively, which are freely available from the American Type Culture Collection.

The nutrient media fermented in the method of this invention are conventional in themselves and contain assimilable sources of carbon and nitrogen, and inorganic salts. Minor amounts of organic nutrients such as vitamins, and amino acids may also be added to the culture media. Suitable carbon sources include carbohydrates, such as glucose, fructose, galactose, mannose, mannitol, sucrose, starch, starch hydrolyzate, and molasses; alcohols such as methyl alcohol, ethyl alcohol, propyl alcohol, butyl alcohol, and glycerine; organic acids such as acetic acid, lactic acid, butyric acid, propionic acid, and fumaric acid; hydrocarbons such as n-alkanes having carbon chains of 8 to 20 members; and aromatic compounds such as phenol, benzyl alcohol, and benzoic acid. Suitable nitrogen sources include organic or inorganic compounds containing nitrogen such as nitrates, ammonium salts, gaseous ammonia, ammonium hydroxide solution, and urea.

For a good yield of tyrosine, the fermentation is carried out aerobically with aeration and/or agitation. Achievement of a good yield requires pH control within the range of 5 to 9. The desired pH may be maintained by adding gaseous or aqueous ammonia, calcium carbonate, alkali metal hydroxide, urea, or organic or inorganic acids to the medium from time to time, and some of the pH controlling agents may also supply assimilable nitrogen. When the fermentation is carried out at 24°C to 37°C, the concentration of tyrosine in the broth reaches its maximum within 2 to 7 days.

The tyrosine accumulated in the fermentation broth can be recovered by conventional methods, such as by removing the cells by filtration or centrifuging, and passing the cell-free broth through an ion exchange resin, or by precipitation of tyrosine from the broth at the isoelectric point of tyrosine. The tyrosine present in the broth was determined by bio-assay employing Leuconostoc citrovorum.

The following Examples further illustrate the invention:

EXAMPLE 1

Cells of Brevibacterium flavum ATCC 14067 previously cultured in an aqueous complete medium for 20 hours were suspended in M/10 phosphate buffer, and exposed to 0.1 M/ml diethyl sulfate mixed with the buffer for 35 minutes. Thereafter, the cells were collected by centrifuging, washed with phosphate buffer, and cultured in a complete medium containing 50 γ/ml of m-fluorophenylalanine for 24 hours. The microorganisms grown in the medium were transferred to an agar complete medium containing 500 γ/ml m-fluorophenylalanine, and the strains tolerant to the higher concentration of m-fluorophenylalanine were harvested. The strains capable of producing tyrosine were selected among the strains tolerant to m-fluorophenylalanine by culturing the latter in the aqueous culture medium described below. The mutant most effectively producing tyrosine was purified by conventional methods, and named Brevibacterium flavum AJ 3258 (FERM-P 422).

An aqueous culture medium was prepared which contained, per deciliter, glucose 10 g, monobasic potassium phosphate 0.1 g, magnesium sulfate 0.04 g, ammonium sulfate 4 g, ferric ion 0.2 mg, manganese ion 0.2 mg, biotin 20 μg, and thiamine·HCl 20 μg. 20 ml batches of the medium were placed in 500 ml flasks and sterilized with steam. Each batch was mixed with one gram of separately sterilized calcium carbonate and was then inoculated with Brevibacterium flavum FERM-P 422. The fermentation was carried out at 31.5°C, for 70 hours with shaking. After the cultivation, 220 mg/dl tyrosine were found in the fermentation broth.

EXAMPLE 2

Spontaneously induced mutants of *Brevibacterium lactofermentum* ATCC 13870 capable of growing in a medium containing more than 1,000 γ/ml m-fluorophenylalanine, were selected by screening as in Example 1. Strains capable of producing tyrosine were selected from the mutants tolerant to m-fluorophenylalanine, and Brevibacterium lactofermentum FERM-P 423 was found most effective. Employing the same medium as in Example 1, Brevibacterium lactofermentum FERM-P 423 was cultured under the same conditions as in Example 1. After 70 hours of cultivation, 62 mg/dl tyrosine was found in the fermentation broth.

300 Ml of the combined broths were centrifuged to remove cells, and passed over an ion exchange resin. 153 Mg crude tyrosine crystals were obtained from the eluate.

EXAMPLE 3

Bacillus subtilis FERM-P 464, which is a mutant of Bacillus subtilis ATCC No. 13952, and was recovered from the parent strain because it is tolerant to m-fluorophenylalanine in an amount of more than 500 γ/ml, was inoculated into a medium identical with that described in Example 1, but additionally containing 10 mg/dl of adenine, and cultured under the same conditions as in Example 1. After 70 hours of cultivation, 15 mg/dl tyrosine was found in the fermentation broth.

EXAMPLE 4

Candida lipolytica FERM-P 424 was selected from Candida lipolytica ATCC 16617 by virtue of its growth in the presence of 50 γ/ml m-fluorophenylalanine in a medium, and cultured as described in Example 1. After 70 hours of cultivation, 2.0 mg/dl tyrosine was found in the fermentation broth.

What is claimed is:

1. A method of producing L-tyrosine which comprises:
   a. selecting a microorganism which is a mutant of one of the genera Brevibacterium, Bacillus, and Candida, said mutant being capable of growing on a culture medium containing an amount of m-fluorophenylalanine greater than 50 γ/ml and sufficient to suppress growth of the parent strain thereof and capable of producing extracellular tyrosine when grown on a nutrient medium containing sources of assimilable carbon and nitrogen and inorganic salts necessary to microbial growth;
   b. culturing the selected microorganism on said medium until L-tyrosine accumulates in said medium; and
   c. recovering the accumulated L-tyrosine from said medium.

2. A process according to claim 1, wherein said microorganism is *Brevibacterium flavum* FERM-P 422.

3. A process according to claim 1, wherein said microorganism is *Brevibacterium lactofermentum* FERM-P 423.

4. A process according to claim 1, wherein said microorganism is *Bacillus subtilis* FERM-P 464.

5. A process according to claim 1, wherein said microorganism is *Candida lipolytica* FERM-P 424.

6. A method as set forth in claim 1, wherein said selecting includes exposing cells of said parent strain to a mutagenic agent in a dosage effective to cause mutation, inoculating a nutrient medium modified to contain said amount of m-fluorophenylalanine with the exposed cells, collecting the microorganisms capable of growth on said modified medium, and selecting among the collected microorganisms a microorganism capable of producing L-tyrosine on said nutrient medium.

7. A method as set forth in claim 1, wherein said amount of m-fluorophenylalanine is at least 500 γ/ml.

8. A method as set forth in claim 1, wherein said parent strain is unable to produce significant amounts of extracellular tyrosine when cultured on said nutrient medium.

9. A method as set forth in claim 1, wherein said microorganism is selected by inoculating a culture medium modified to contain 500 γ/ml m-fluorophenylalanine with microorganisms of said genera, collecting the microorganisms capable of growth on said modified medium, and selecting among the collected microorganisms a microorganism capable of producing L-tyrosine on said nutrient medium.

* * * * *